United States Patent [19]

Callahan

[11] 4,207,666
[45] Jun. 17, 1980

[54] AFTERMARKET SPEEDOMETER CABLE AND CASING ASSEMBLIES AND METHODS OF FABRICATION THEREOF

[75] Inventor: John W. Callahan, Peapack, N.J.

[73] Assignee: Pennwalt Corporation, Philadelphia, Pa.

[21] Appl. No.: 909,413

[22] Filed: May 25, 1978

[51] Int. Cl.$^2$ .............................................. B23P 7/00
[52] U.S. Cl. ...................................... 29/402.08; 74/12
[58] Field of Search ................ 29/401 E, 401 F, 402, 29/402.08; 73/493, 488, 2; 74/12

[56] References Cited

U.S. PATENT DOCUMENTS

| | | | |
|---|---|---|---|
| 1,375,009 | 4/1921 | Nash | 74/12 |
| 3,775,828 | 12/1973 | Kopenhaver | 29/401 |

FOREIGN PATENT DOCUMENTS 488313  12/1953  Italy ............................................ 74/12

*Primary Examiner*—Milton S. Mehr

[57] ABSTRACT

A sleeve member interconnects an upper and lower length of replacement casing, which lengths are associated with the vehicle speedometer and transmission respectively. The upper length is crimped into one end of the sleeve member while the lower length is slidably adjustable with the remaining portion thereof. By a series of process steps, the interconnected lengths of replacement casing will contain a replacement rotatable flexible shaft cable therein, which cable is provided with a square tipped cable fitting at each end thereof, one of which operatively engages the vehicle speedometer while the other engages the transmission. By virtue of the slidably adjustable lower casing length within the sleeve member, proper protrusion of the cable fitting square tips is insured. The adjustable length of casing may then be rigidly crimped into the sleeve member. Thus, no preformed square ends are required on the replacement cable and yet the process permits the use of replacement casing material having an inside diameter no larger than that of the original equipment casing, the latter feature providing a quietly operating aftermarket device.

1 Claim, 4 Drawing Figures

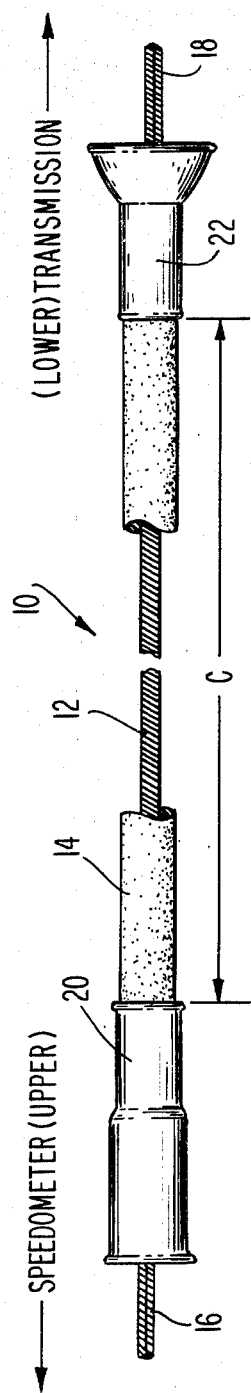
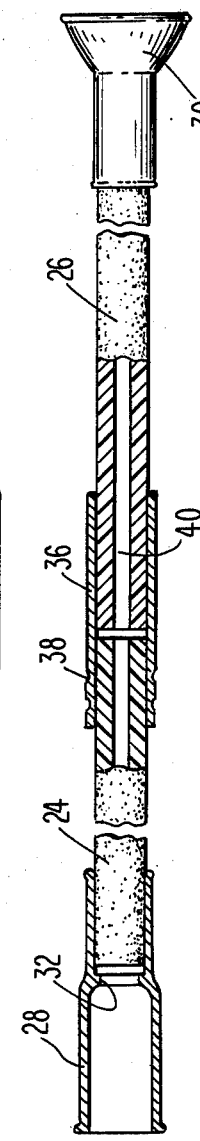
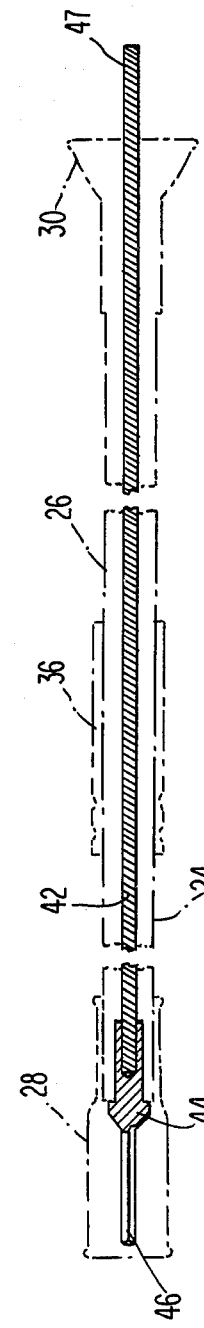
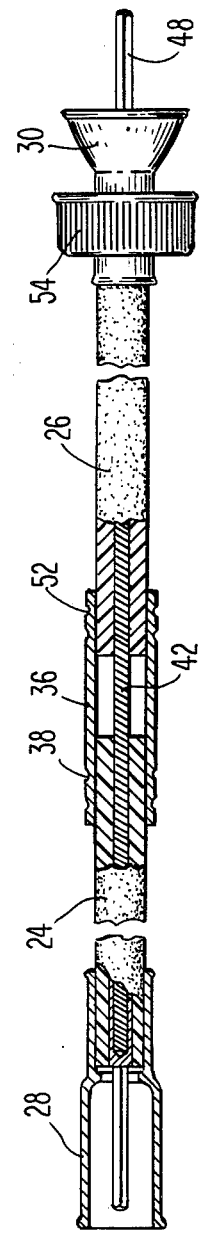

AFTERMARKET SPEEDOMETER CABLE AND CASING ASSEMBLIES AND METHODS OF FABRICATION THEREOF

STATEMENT OF THE INVENTION

This invention relates to speedometer cable and casting assemblies and more particularly concerns the simple and convenient aftermarket fabrication of such assemblies for replacement purposes.

BACKGROUND OF THE INVENTION

The cable of a speedometer cable assembly is a rotatable flexible shaft which transmits torque from the vehicle transmission to the speedometer. In original equipment, the cable is usually provided with an integrally formed square at each end, one end of which communicates with the transmission and the other being connected to the speedometer.

Cars and light trucks may be equipped with any one of hundreds of different diameter and/or length cables. Maintaining a stock of such cables with preformed squared ends for aftermarket replacement purposes is not economically desirable to the original equipment manufacturer.

Replacement cable is usually cut from a roll, and hence will have no preformed squared ends. Thus, the use of cable fittings is required. The cable fitting is provided with a squared tip which should have a cross-section identical with the cross-section of the original cable preformed squared end. The cable fitting is readily crimped onto the replacement cable. A replacement cable assembly thus includes a flexible shaft cable, and a cable fitting crimped onto each end thereof. A cable fitting is often referred to as a cable tip.

The casing of the casing assembly is a flexible covering or sheath which protects the cable from dirt, corrosive elements and bruises of various sorts. The casing assembly includes a casing, a ferrule crimped over each end of the casing, and means for attaching the ferrules to the transmission housing and speedometer head respectively. A snap-on type ferrule may be used at the upper, or speedometer end, and a plug type ferrule may be used at the lower, or transmission end. The squared tips of the cable fittings, or portions thereof, are positioned within the outer flared portion of the ferrules.

For one reason or another, either or both assemblies, i.e., cable or casing assemblies, must be replaced from time to time because of damage, malfunction, or wear. Since, as abovementioned, the cables of cable assemblies are so varied, original equipment manufacturers now prefer to fabricate replacement assemblies as they are needed rather than to stock a complete and costly inventory.

Prior art aftermarket casing assemblies are usually made from casings having an inside diameter larger than that of original equipment casings in order that the cable tips can pass therethrough. The clearance between the cable and casing should be kept to a minimum to avoid any "whipping" action therebetween which creates much undesirable noise. As an example, many domestic passenger cars are equipped with cables having a diameter of 0.130 inches. The inside diameter of original casings for such cables is usually 0.135-0.145 inches. Since cable tips could not pass therethrough, it was customary to employ casings having an diameter of 0.170 inches, resulting in considerable increase in noise.

Further, merely duplicating or attempting to duplicate the length of the cable to be replaced did not usually result in a satisfactory replacement cable assembly. It must be borne in mind that replacement cable is ordinarily devoid of any preformed square ends, necessitating the use of cable fittings which results in a shorter cable being required, the length to be deducted depending upon the length to be inserted into both cable fittings. Not infrequently though the cable to be replaced was severed, or severely frayed, rendering attempts to cut duplicate cable lengths quite difficult. Thus, such aforedescribed replacement cables were often of improper length, and prevented proper protrusion of the squared tips of the cable fittings into the transmission and speedometer assemblies. It must be appreciated that even a slightly excessive protrusion of the cable fitting tips into the transmission and/or speedometer assemblies will often cause the cable to bind in the casing. On the other hand, if the squared tips do not protrude sufficiently, inadequate engagement with the mating parts will often result in premature damage or malfunctioning of the tips and/or cable.

SUMMARY OF THE INVENTION

The present invention provides for the simple and convenient fabrication of aftermarket speedometer cable and casing assemblies by means of a sleeve member disposed intermediate a pair of replacement casing lengths, which sleeve enables the proper protrusion of the square tips from the casing assembly to operatively engage their respective vehicle assemblies and yet permits casings to be used which have an inside diameter no greater than that of the original casing, thus resulting in a replacement assembly which operates as quietly as the original equipment.

BRIEF DESCRIPTION OF THE DRAWINGS

FIG. 1 is a diagrammatic illustration of typical original equipment passenger car or light truck speedometer cable and casing assembly.

FIG. 2 is a partially sectioned, longitudinal view of a replacement speedometer casing assembly made in accordance with the present invention and illustrates several steps in its fabrication.

FIG. 3 is a view, partially sectioned, part in phantom, of a portion of a replacement cable and casing assembly of the invention illustrating additional steps in its fabrication.

FIG. 4 is a partially sectioned view of a complete aftermarket cable and casing assembly made in accordance with the present invention, which view is illustrative of still further steps in the fabrication of the assembly.

DETAILED DESCRIPTION OF THE INVENTION

In FIG. 1, original equipment speedometer cable and casing assembly 10 to be replaced includes a flexible shaft cable 12 rotatable within a flexible protective outer casing 14. The cable is provided with integrally formed squared ends 16 and 18 which engage mating components in a speedometer and transmission assembly (not shown) respectively. Ferrules 20 and 22 are crimped over casing 14 and ferrule nuts (not shown) secure casing 14 to the speedometer head and transmission housing.

Fabrication of a replacement speedometer cable and casing assembly in accordance with the present invention comprises the following steps:

Step 1: After removing assembly 10 (FIG. 1) from the vehicle, separate cable 12 from the casing 14.

Step 2: Cut a piece of replacement casing having a length C from a roll of the casing material. Replacement casing C inside diameter should be substantially identical with that of casing 14.

Step 3: Cut replacement casing C into 2 parts 24 and 26 (FIG. 2) and attach one each of new ferrules 28 and 30 (which match old ferrules 20 and 22 respectively) to an end of casing 24 and 26 as shown. Casing 24 and 26 should be inserted approximately ¾" into their respective ferrules, or to a built-in stop, if provided, such as stop 32. Ferrules 28 and 30 are then securely crimped onto their respective casing ends.

Step 4: Insert other end of casing 24 into a metal sleeve 36 about ½" and crimp the sleeve thereover, as indicated by numeral 38. At this point, other end of casing 26 may be inserted into other end of sleeve 36 until casing 26 abuts casing 24. Sleeve 36 is normally 2½" to 3" in length. The inside diameter 40 of the replacement casing is 0.135" to 0.145" when a cable diameter of 0.130" is used therewith.

Step 5: From a roll of flexible shaft material of the same diameter as cable 12 to be replaced, cut a replacement flexible shaft cable 42 approximately 1" longer than the entire length of the casing assembly shown in FIG. 2, i.e., the distance between the outermost portions of ferrules 28 and 30.

Step 6: Attach a cable tip 44 to the speedometer end (upper end) of cable 42 and crimp thereon (FIG. 3). Tip 44 is provided with a squared tip 46 having a cross-section identical with the cross-section of integrally formed square end 16 of cable 12. It is desirable that cable tip 44 be selected with care in order to insure the proper protrusion of squared tip 46 into ferrule 28, which ferrule matches ferrule 20. Squared tip 46 will normally be 0.104" square when a 0.130" cable is used.

Step 7: Insert the untipped end of cable 42 into ferrule 28 of the casing assembly of FIG. 2 until tip 44 nests securely therewithin. A portion of cable 42 will protrude through ferrule 30 as indicated at 47.

Step 8: Cut off that portion of cable 42 which protrudes through ferrule 30 in excess of about ½" and seat another cable tip 48 onto cable 42 and crimp (FIG. 4).

Step 9: Withdraw the transmission end (lower end) of the casing assembly carefully from sleeve 36 until tip 48 is pulled into ferrule 30 and protrudes a proper distance therefrom. Sleeve 36 is then crimped at 52 over casing 26 to complete the assembly. Only one ferrule nut 54 is shown, it being understood that the upper end will likewise be provided with a ferrule nut unless, of course, a snap-on type fitting is used. Similarly, the lower end may be provided with a plug type ferrule, obviating the need for ferrule nut 54.

Step 10: Install the replacement speedometer cable and casing assembly into the vehicle.

It is appreciated that the present invention is equally operable with cable tips and/or ferrules made of metal or plastic, typically nylon. A plastic cable tip or fitting can readily be crimped over a cable by means of a metal crimping ring placed over that portion of the fitting which would normally be crimped, if made of metal, thereby causing the plastic fitting to be permanently attached to the cable. Plastic ferrules may be similarly attached to casings, or the plastic ferrule may be directly crimped onto a casing as would a metal ferrule.

An alternate method of permanently attaching a plastic cable tip or fitting to a cable requires prefilling the bore of a cable fitting with a low melting point adhesive and inserting the cable end thereinto after the cable end is heated with a match or cigarette lighter.

It will also be appreciated that the present invention may be practiced advantageously notwithstanding ferrules may be employed which are not provided with built-in stops and thus may be slidable over the entire length of casing. In such case, the ferrules will be disposed on the casing in back-to-back relationship. The cable will be inserted into the casing before cable tips are crimped onto the cable ends. After crimping, the ferrules may be moved to their respective casing ends and crimped thereon. I have found such method as abovedescribed to require precise mesurements of cable and casing lengths, as well as the distance the cable must be inserted into each cable fitting, in addition to the distance the casing must be inserted into each ferrule. The present invention permits less than precise measurements, since the controlled withdrawal of the lower casing with the sleeve member more than compensates for such convenient approximations.

Longer speedometer cable and casing assemblies, approaching 8 feet in length, for example, will normally employ proportionately longer sleeves.

For reasons just discussed, the present sleeve arrangement permits aftermarket replacement of the entire cable and casing assemblies notwithstanding the cable to be replaced has been completely severed.

Although the present invention will find wide usage in passenger cars and light trucks, the latter comprising pick-up type vehicles, vans, 1-ton trucks, etc., it is not intended that the invention be so limited, since heavy duty trucks, buses, motor homes, and the like, are expected to benefit from practicing the present invention.

I claim:

1. Process for fabricating a replacement speedometer cable assembly and casing assembly for a motor vehicle, said replacement cable assembly including a flexible shaft cable devoid of any preformed squared ends and said replacement casing assembly including a flexible protective casing having an internal diameter substantially identical with that of casing being replaced, said flexible shaft cable and said internal diameter of said replacement casing having a ratio of diameters substantially equivalent to original equipment of said motor vehicle, said process comprising the steps of removing speedometer cable and casing assembly to be replaced from said vehicle and using said removed assembly as a guide, cutting a sufficient length of said replacement protective casing from a roll thereof into two pieces, one of said pieces being designated the speedometer casing piece and the other being designated the transmission casing piece, crimping a ferrule over one end of each of said speedometer casing piece and transmission casing piece, inserting other end of said speedometer casing piece into a lesser portion of a sleeve and crimping said sleeve thereover, inserting other end of said transmission casing piece into open end of said sleeve until said transmission casing piece abuts said crimped speedometer casing piece, cutting a sufficient length of said replacement flexible shaft cable from a roll thereof, crimping a cable fitting over one end of said replacement flexible shaft cable, said cable fitting having a squared tip end matingly operable with speedometer of said vehicle, inserting untipped end of said replacement flexible shaft cable through said ferrule crimped onto said speedometer casing piece to securely nest said cable fitting therein, said sufficient length of cable extending a distance beyond said ferrule crimped over said transmission casing piece, crimping another cable fitting onto said extended cable, said another cable fitting having a squared tip end matingly operable with transmission of said vehicle, both of said cable fittings being incapable of passing through said internal diameter of said replacement casing, withdrawing said transmission casing piece from said sleeve until proper length of protrusion of said tip end beyond said ferrule crimped over said transmission casing piece is obtained, and crimping said sleeve over said transmission casing piece.

* * * * *